(12) United States Patent
Power

(10) Patent No.: US 8,076,414 B2
(45) Date of Patent: Dec. 13, 2011

(54) ADHESION PROMOTER COMPOSITION

(75) Inventor: John W. Power, Memphis, TN (US)

(73) Assignee: W.M. Barr & Company, Inc., Memphis, TN (US)

( * ) Notice: Subject to any disclaimer, the term of this patent is extended or adjusted under 35 U.S.C. 154(b) by 925 days.

(21) Appl. No.: 12/005,996

(22) Filed: Dec. 28, 2007

(65) Prior Publication Data

US 2009/0169755 A1 Jul. 2, 2009

(51) Int. Cl.
*C08F 8/00* (2006.01)
*C08L 67/00* (2006.01)
(52) U.S. Cl. ...... 525/168; 427/331; 427/352; 427/407.1
(58) Field of Classification Search ............... 427/331, 427/352, 407.1; 525/168
See application file for complete search history.

(56) References Cited

U.S. PATENT DOCUMENTS

| | | | |
|---|---|---|---|
| 3,703,406 A | 11/1972 | Sakurada et al. | |
| 4,245,059 A | 1/1981 | Ichimura et al. | |
| 4,355,053 A * | 10/1982 | Nezu et al. | 427/516 |
| 4,755,557 A | 7/1988 | Atkins et al. | |
| 4,777,196 A | 10/1988 | Hefner | |
| 4,992,490 A | 2/1991 | Childress et al. | |

* cited by examiner

*Primary Examiner* — Terressa Boykin
(74) *Attorney, Agent, or Firm* — Baker Donelson Bearman Caldwell & Berkowitz, PC

(57) ABSTRACT

A composition for improving the adhesion of a paint to a surface, wherein the composition comprises an unsaturated polyester, a modified acrylic resin, a polymerization inhibitor, an aromatic solvent and either divinylbenzene, isopropenyl-2-methyl benzyl isocyanate or an acrylic monomer.

13 Claims, No Drawings

ADHESION PROMOTER COMPOSITION

TECHNICAL FIELD

This invention relates to an improved adhesion promoter composition. In a more specific aspect, this invention relates to an improved adhesion promoter composition for use with various types of paint.

In this application, the term "paint" will be understood to refer to pigmented coatings such as epoxies, enamels, primers, basecoats, oil-based paints, latexes, varnishes and polyurethane finishes which are used to protect and/or beautify substrates.

The composition of this invention can be used to promote (i.e., increase) the adhesion of paint to various substrates, examples of which are metal, wood, plastic, glass, porcelain, polypropylene, ceramic, painted surfaces and chrome.

BACKGROUND OF THE INVENTION

Compositions for promoting or increasing the adhesion of paint to various substrates are known in the industry. For example, certain compositions for use in automobile finishing applications are disclosed in Childress et al. U.S. Pat. No. 4,992,490.

However, for various reasons, the prior art compositions tend to have one or more disadvantages in regard to method of application, components of the composition, results of application, etc. For example, certain prior art compositions may require extended periods for drying of the composition, or may require sanding prior to the application of paint to obtain an acceptable paint finish.

Additionally, as local, state and federal governments require stricter controls on the amount of volatile organic compounds and/or combustible chemicals which can be used, the prior art compositions often must be changed to comply with those controls, and these changes can lead to a decrease in product quality.

Ozone generation may also be a concern for certain prior art compositions. Also, when working with some prior art compositions, the user must be concerned about the disposal of hazardous substances and the use of non-renewable resources. These latter two concerns are becoming more important as environmental issues become more significant.

Thus, for various reasons, the prior art compositions may not achieve the desired results in many situations. Therefore, there is a need in the industry for an improved adhesion promoter composition which eliminates or minimizes the disadvantages or problems which are encountered with the prior art compositions.

SUMMARY OF THE INVENTION

The present invention provides a composition for improving (or increasing) the adhesion of paint to various surfaces. Additionally, the composition of this invention complies with current regulations in regard to volatile organic compounds, requires less time for drying (based on being tack free) and provides reduced hazardous air pollutants (HAPS).

The present invention also provides a process for improving the adhesion of a paint to a surface.

Briefly described, the present invention provides a new and improved composition which comprises an unsaturated polyester, a modified acrylic resin, an aromatic solvent and either divinylbenzene, isopropenyl-2-methyl benzyl isocyanate or an acrylic monomer.

Accordingly, an object of this invention is to provide a composition for improving the adhesion of a paint to a surface.

Another object of this invention is to provide such a composition which complies with current regulations for volatile organic compounds.

Another object of this invention is to provide such a composition which requires less time for drying when compared to the prior art.

Still another object of this invention is to provide a process for improving the adhesion of a paint to a substrate.

Still another object of this invention is to provide such a process which results in improved drying times when compared to the prior art.

These and other objects, features and advantages of the present invention will become apparent from the following description.

DETAILED DESCRIPTION OF THE INVENTION

The present invention provides a composition which can be used to treat various surfaces to improve the adhesion of a paint to a surface. This composition comprises an unsaturated polyester, a modified acrylic resin, a polymerization inhibitor, an aromatic solvent and either divinylbenzene, isopropenyl-2-methyl benzyl isocyanate or an acrylic monomer. The present invention also provides a process by which the above-defined composition can be used to treat a surface to achieve improved adhesion of paint to that surface.

As defined above, there are certain essential components in the composition of this invention. These components and their corresponding weight present ranges are shown below, with the weight percent being based on the total weight of the composition.

| Component | Weight Percent Range |
| --- | --- |
| Unsaturated Polyester | about 1.0 to about 20.0 (preferably about 5.0 to about 15.0) |
| Modified Acrylic Resin | about 1.0 to about 30.0 (preferably about 3.0 to about 15.0) |
| Polymerization Inhibitor | about .0001 to about .50 (preferably about .001 to about .05) |
| Aromatic Solvent | about 4.0 to about 50.0 (preferably about 10.0 to about 20.0) |
| Divinylbenzene, Isopropenyl-2-methyl benzyl isocyanate or Acrylic Monomer | about 1.0 to about 10.0 (preferably about 2.0 to about 5.0) |

If these components are used in amounts outside these ranges, the composition may provide result which do not meet the user's objectives for improved adhesion of paint to a surface.

Optional components may be added to the composition of this invention to achieve other objectives. Examples of these optional components are preservatives, colorants, evaporation retardants, anti-settling agents, pigments, thixotropic agents, bittering agents, etc. These optional components can be used in the amounts necessary to achieve desired results.

The unsaturated polyester components useful in this invention are commercially available products. These polyesters (sometimes referred to as polyester alkyds) are a class of soluble, linear, low molecular weight materials which contain both carboxylic ester groups and carbon-carbon double bonds as recurring units along the main polymer chain. These polyesters may be prepared by condensation of long chain polyols, diols, ethylenically unsaturated dicarboxylic acids or anhydrides (to impart unsaturation) and saturated dicarboxylic acids to modify the polyester.

Suitable unsaturated polyesters are the usual condensation products of polybasic acids, in particular dibasic carboxylic acids and their esterifiable derivatives (such as their anhydrides) with polyhydric alcohols. Preferred unsaturated polyesters are those formed from maleic anhydride and propylene glycol; 1,3-propanediol; 1,4-butanediol; neopentyl glycol; ethylene glycol; diethylene glycol; dipropylene glycol and/or dicyclopentadiene.

In this invention, the modified acrylic resin component is also commercially available. A preferred modified acrylic resin is a thermoplastic acrylic resin comprising methyl methacrylate and butyl acrylate and available under the trademark PARALOID from Kemco International Associates of St. Petersburg, Fla. The modified acrylic resin component is effective to achieve good adhesion of the composition to multiple surfaces, especially plastic surfaces.

Examples of modified acrylic resins that may be used in the composition of this invention are addition products of polyepoxides and unsaturated carboxylic acids, preferably acrylic acid and methacrylic acid. Suitable polyepoxides are epoxy novolac resins and, in particular, polyepoxides based on bisphenol A. Another suitable class of vinyl ester resins is the esterification products of alkoxylated bisphenol A and (meth)acrylic acid.

Additionally, the modified acrylic resin can be a chlorinated acrylic resin which may be modified by an acrylate monomer, such as methyl acrylate, ethyl acrylate, methyl methacrylate and ethyl methacrylate.

The polymerization inhibitor components useful in this invention are materials known in the industry. Examples of suitable polymerization inhibitors include hydroquinone, totulhydroquinone, di-tert-butylhydroxy-toluene, para-tert-butylcatechol, mono-tert-butylhydroquinone, hydroquinone monomethyl ether, butylated hydroxyanisole and para-benzoquinone.

For purposes of this invention, the aromatic solvent component can be any hydrocarbon solvent which contains a benzene ring or a mixture of two or more of these solvents. A series of useful solvents is obtained by replacing one or more of the benzene ring hydrogen with other hydrocarbon groups; for example, one or more methyl, ethyl, propyl, etc. groups. Preferred aromatic solvents are the xylenes (ortho, meta and para); toluene; benzene; ethyl benzene; isopropyl benzene; cumene; trimethyl benzene; and divinylbenzene.

The fourth essential component of this invention is divinylbenzene, isopropenyl-2-methyl benzyl isocyanate or an acrylic monomer.

The acrylic monomer can be mono- or poly-functional but must be copolymerizable with the unsaturated polyester and/or vinyl ester. Preferred monomers are styrene, alpha-methyl styrene, chlorostyrene, vinyl toluene, divinyl benzene, methyl methacrylate, ethyl methacrylate, ethyl acrylate, methyl acrylate and mixtures thereof.

The adhesion promoter composition of this invention can be either applied to the substrate to be painted or mixed with the paint prior to the paint being applied to the substrate.

The present invention is further illustrated by the following example which is designed to teach one of ordinary skill in the art how to practice this invention and to represent the best mode contemplated for carrying out this invention.

Procedure

The following composition was prepared using standard techniques and process steps.

EXAMPLE 1

| Component | Weight Percent |
|---|---|
| T-Butyl Acetate | 27.588 |
| (1) Polylite 32-737 Resin | 15.000 |
| Xylene | 14.899 |
| (2) Paraloid B-48N | 5.000 |
| (3) Acrylic Resin | 14.000 |
| Divinylbenzene | 3.000 |
| 2-Butoxy Ethanol | 2.100 |
| Methyl Amyl Ketone | 5.630 |
| (4) Oxsol 100 | 7.000 |
| Methyl Acetate | 5.000 |
| Ethyl Methacrylate | 0.500 |
| Hydroquinone Monomethyl Ether | 0.033 |
| (5) BYK 358 | 0.250 |
|  | 100.000 |

(1) an unsaturated polyester resin available from Reichhold Inc. (Durham, North Carolina).
(2) a modified acrylic resin available from Chem Central (Memphis, Tennessee).
(3) an acrylic resin made from styrene, methyl methacrylate, lauryl methacrylate, tridecyl methacrylate, methacrylic acid and a chlorinated homopolymer of 1-propene.
(4) 1-chloro-4-trifluoromethyl benzene available from Occidental Chemical Corporation (Dallas, Texas).
(5) an acrylate copolymer available from BYK Co. (Wesel, Germany).

This composition was applied to a substrate. The adhesion of the composition was then determined according to the procedure ASTM D-4541-02. The composition could not be removed from the substrate until a pressure of 245 psi was attained.

The present invention has been described in detail with particular reference to certain embodiments, but variations and modifications can be made without departing from the spirit and scope of the invention as defined in the following claims.

What is claimed is:

1. A composition which consists essentially of:
   A. from 1.0 to 20.0 weight percent of an unsaturated polyester;
   B. from 1.0 to 30.0 weight percent of a modified acrylic resin;
   C. from 0.0001 to 0.50 weight percent of a polymerization inhibitor;
   D. from 4.0 to 50.0 weight percent of an aromatic solvent; and
   E. from 1.0 to 10.0 weight percent of divinylbenzene, isopropenyl-2-methyl benzyl isocyanate or an acrylic monomer,
   wherein a surface treated with the composition provides improved adhesion of a paint to the surface.

2. A composition as defined by claim 1 wherein the composition contains from about 5.0 to about 15.0 weight percent of the unsaturated polyester.

3. A composition as defined by claim 1 wherein the composition contains from about 3.0 to about 15.0 weight percent of the modified acrylic resin.

4. A composition as defined by claim 1 wherein the composition contains from about 0.001 to about 0.05 weight percent of the polymerization inhibitor.

5. A composition as defined by claim 1 wherein the composition contains from about 10.0 to about 20.0 weight percent of the aromatic solvent.

6. A composition as defined by claim 1 wherein the composition contains from about 2.0 to about 5.0 weight percent of divinylbenzene, isopropenyl-2-methyl benzyl isocyanate or an acrylic monomer.

7. A process for improving adhesion of a paint to a surface by treating the surface with a composition which consists essentially of:

A. from 1.0 to 20.0 weight percent of an unsaturated polyester;
B. from 1.0 to 30.0 weight percent of a modified acrylic resin;
C. from 0.0001 to 0.50 weight percent of a polymerization inhibitor;
D. from 4.0 to 50.0 weight percent of an aromatic solvent; and
E. from 1.0 to 10.0 weight percent of divinylbenzene, isopropenyl-2-methyl benzyl isocyanate or an acrylic monomer, and then applying the paint to the surface.

8. A process as defined by claim 7 wherein the surface is treated with the composition by brushing, spraying, dipping, pouring or rolling.

9. A process as defined by claim 7 wherein the composition contains from about 5.0 to about 15.0 weight percent of the unsaturated polyester.

10. A process as defined by claim 7 wherein the composition contains from about 3.0 to about 15.0 weight percent of the modified acrylic resin.

11. A process as defined by claim 7 wherein the composition contains from about 10.0 to about 20.0 weight percent of the aromatic solvent.

12. A process as defined by claim 7 wherein the composition contains from about 0.001 to about 0.05 weight percent of the polymerization inhibitor.

13. A process as defined by claim 7 wherein the composition contains from about 2.0 to about 5.0 weight percent of divinylbenzene, isopropenyl-2-methyl benzyl isocyanate or an acrylic monomer.

* * * * *